United States Patent [19]
Acquaviva

[11] Patent Number: 5,710,957
[45] Date of Patent: Jan. 20, 1998

[54] REPRODUCTION APPARATUS TRANSMISSIVITY SENSOR SYSTEM FOR DUPLEX DOCUMENTS

[75] Inventor: Thomas Acquaviva, Penfield, N.Y.

[73] Assignee: Xerox Corporation, Stamford, Conn.

[21] Appl. No.: 751,893

[22] Filed: Nov. 18, 1996

[51] Int. Cl.[6] .................. G03G 15/04; G03G 21/00
[52] U.S. Cl. ............................................ 399/45; 399/9
[58] Field of Search ........................... 399/151, 9, 45, 399/364

[56] References Cited

U.S. PATENT DOCUMENTS

| | | | |
|---|---|---|---|
| 4,456,372 | 6/1984 | Yamauchi | 355/75 |
| 4,721,981 | 1/1988 | Rauen et al. | 271/244 X |
| 4,745,438 | 5/1988 | Acquaviva et al. | 355/14 |
| 4,921,240 | 5/1990 | Watson | 271/245 |
| 5,053,818 | 10/1991 | Smith | 355/214 |
| 5,488,464 | 1/1996 | Wenthe, Jr. et al. | 355/233 |

FOREIGN PATENT DOCUMENTS 3110577  9/1989  Japan.

OTHER PUBLICATIONS

Patent Abstracts of Japan, vol. 11, NO. 42, p. 545, Feb. 6, 1987 and JP-A-61212862, Sep. 20, 1986.

*Primary Examiner*—R. L. Moses

[57] ABSTRACT

In a document reproduction apparatus with an imaging station and a sheet feeding system for feeding physical document sheets in a sheet feeding path at a first velocity in a document sheet motion direction to the imaging station to be imaged, with a transmissivity sensor for measuring the transmissivity of the document sheets to provide an imaging control signal for reducing show-through imaging defects from light transmissive document sheets including opposite side images of duplex documents, there is provided a document sheet light transmissivity measurement system with a scanning system for linearly moving a single scanner on a single axis at a second velocity across the sheet feeding path orthogonally of the document motion direction in coordination with the document sheet movement at the first velocity so that the scanner diagonally scans the document on two axes before the document is imaged, to provide a more accurate transmissivity measurement of the document sheet than a single axis transmissivity scan, preferably with a ratio of these first and second velocities equal to the ratio of the side and end dimensions of the document being scanned to scan diagonally across the document from one corner to an opposite corner and thereby scan into all four of the possible unprinted edge margins of the document to obtain an imaging control signal therefrom.

11 Claims, 3 Drawing Sheets

REPRODUCTION APPARATUS TRANSMISSIVITY SENSOR SYSTEM FOR DUPLEX DOCUMENTS

Disclosed in the embodiment herein is a document reproduction apparatus for optically or digitally imaging physical document sheets being fed to an imaging station, wherein the scanning movement of a simple and compact linear motion transmissivity sensor scanning in only one axis, orthogonal the document sheet motion direction, is coordinated with the timing and movement velocity of the document sheet past that sensor movement axis so as to transversely scan the document on two axes before the document is imaged, desirably scanning the document from one corner to an opposite corner to scan all four edge margins, to provide a transmissivity measurement of the document sheet substrate which is less error prone and more accurate than a single axis transmissivity scan, and does not require a delay in the actual imaging.

By way of background, both optical light lens copiers and digital document scanning systems have difficulties in obtaining clean images from original images printed on thin or otherwise partially translucent original documents, that is, non-opaque documents with relatively high light transmissivity, such as 13# weight or lighter paper, Japanese "rice paper", newsprint, etc. This is a particular problem with duplex documents, i.e., documents having printed text or other images on the back side of the document in addition to the front side image being copied or imaged, as is typical of newspapers, and is more common in general as environmental concerns induce more duplex printing and copying. The duplex document back side image can "show through", as it is called, the translucent sheet to be picked up or seen by the imaging system as an interfering or "ghost" image superimposed on the correct, front side, image. However, even simplex documents being imaged, with no back side images or marks, can still have serious "show through" problems if they are translucent or light transmissivity image substrates. Contaminants or marks on the backing surface(s) behind the document in the image area can "show through" the document and be inadvertently imaged. That can be document feed belt edge shadows, or imaging stations with automatic or semi-automatic document feeders. Such document feeder belts or rollers, even if originally white, tend to develop dark areas in use unless cleaned regularly, and where they overlay the imaging area, these dark areas can be inadvertently imaged through the translucent document. "Show-through" defects on the image and/or an ultimate copy print therefrom can even be present in an imaging system in which the document is manually placed on an imaging platen and scanned while held stationary under a stationary cover, where there are dark marks or contaminants on the platen cover or other backing surface, or, as discussed, duplex documents. Various document imaging stations and document feeding systems therefor are well known and need not be described herein. Merely as one recent example, of a duplex document handler for digital imaging, there is cited Xerox Corp. U.S. Pat. No. 5,488,464 issued Jan. 30, 1996, and other document imaging patents are cited therein.

To overcome or reduce these problems, it is known to be desirable for the document illumination or the imaging contrast or background threshold levels, etc., to be specially adjusted in such cases to reduce this "show through" problem. One common adjustment on simple copiers is to change the adjustable copying density setting from "normal" or "copy darker" to "copy lighter" to reduce the printing of "show through" marks or images on the copies. Additionally or alternatively, other special analog or digital software image processing techniques such as thresholding or minimum gray level settings can be used on the captured image after its imaging in order to reduce such "show through" image defects on the final image and any copies. Since these image adjustment techniques are varied and well known, and not the subject of this invention per se, they need not be described herein. However, such imaging adjustments are known to have other potential disadvantages, such as affecting the quality of the desired front side image in some cases, or causing "show-around" or inadequate document edge shadow "fade-out", or even loss of lighter portions of the desired front side image if the imaging threshold level is reduced below that image level. Thus, it is undesirable to use such imaging adjustments unless they are needed, and only to the extent necessary. The system disclosed in the embodiment herein provides improvements in that and other respects.

Further discussions of "show through" and other document imaging problems, and the above-noted and other compensatory adjustments in document imaging, are well known to those in the art and are also discussed in patents cited herein and elsewhere, and thus need not be elaborated on here. One example of an effort to reduce the duplex document show through problem, by automatically generating a black background sheet to put behind the original, is described in Xerox Corp. U.S. Pat. No. 5,053,818 issued October 1, 1991 to Craig A. Smith. Another example of the long standing nature of these problems is also illustrated by Xerox Corp. U.S. Pat. No. 4,745,438 issued May 17, 1988 to the same Thomas Acquaviva, et al. discussing the interrelationship of "show through" to "show-around" or "edge fade-out" problems in document imaging.

Of particular interest as to document transmissivity or density detection with a sensor upstream of a document imaging station is a Japanese published application or Kokai No. 3-110,577 (this number can also written as 91-110,577) laid open May 10, 1991, based on application No. 1-248075 filed Sept. 26, 1989 by Hiroshi Takahashi.

Also of background interest is U.S. Pat. No. 4,456,372 issued June 26, 1984 to K. Yamauchi, in which a copier has a pivotal detector "for detecting either or both the copy density and the size of a document", which detector is automatically moved on an elongated arm in an arc under the imaging platen where the document is located.

Further by way of background, a transmissivity sensor which only scans a document on one axis can be "fooled" by seeing lines, lines of dark print, or other opaque image areas running in that same axis, instead of measuring the transmissivity of the paper or other substrate itself in unprinted areas thereof, between such lines, or in the unprinted margin areas typically found near at least one of the four edges of the substrate sheet.

Thus, an advantage of the simple system illustrated herein is that it provides scanning of the document transmissivity of the document both lengthwise and edgewise, across both axes, yet does not require a large expensive array of multiple sensors nor a large or complex mechanism which must sweep over a large area to accomplish that objective.

A specific feature of the embodiments disclosed herein is to provide a document reproduction apparatus with an imaging station and a sheet feeding system for feeding physical document sheets in a document sheet feeding path at a first velocity in a document sheet motion direction to said imaging station to be imaged and then fed away from said imaging station, said document reproduction apparatus also having a transmissivity sensor for measuring the transmissivity of the document sheets to be imaged to provide an imaging control signal for reducing show-through imaging defects from light transmissive document sheets including show-through imaging of opposite side images on light transmissive document sheets; the improvement comprising a linearly movable document sheet light transmissivity measurement system mounted across said document sheet feeding path outside of said imaging station, a scanning system for linearly moving said document sheet light transmissivity measurement system on a single axis of movement at a second velocity across said document sheet feeding path transversely of said document sheet motion direction, said scanning system being controlled to move said document sheet light transmissivity measurement system transversely across a document sheet moving in said document sheet feeding path in coordination with said document sheet movement past said document sheet light transmissivity measurement system so that said document sheet light transmissivity measurement system diagonally scans the document sheet on two axes, to provide a more accurate transmissivity measurement of the document sheet than a single axis transmissivity scan.

Further specific features disclosed in the embodiments herein, individually or in combination, include those wherein said scanning system is controlled to move said document sheet light transmissivity measurement system with a velocity ratio of said second velocity to said first velocity of the document sheets proportional to the ratio of the dimensions of the orthogonal sides of the document sheet being scanned; and/or wherein said scanning system is controlled to scan said document sheet light transmissivity measurement system diagonally across a document sheet from one corner of the document sheet to an opposite corner of the document sheet; and/or wherein said document sheet light transmissivity measurement system is mounted upstream of said imaging station and moves orthogonally to the direction of movement of the document sheet to diagonally scan the document sheet on two axes before the document is imaged; and/or wherein said document sheet light transmissivity measurement system comprises an unobstructed vertical light beam projecting perpendicularly through the document sheet being scanned.

Another specific feature of the embodiments disclosed herein is to provide a method of imaging a non-opaque duplex document sheet with images on both the first and second sides thereof being imaged at an imaging station by improving the reproduction of the images on one side of the document sheet by reducing the imaged show-through of the second side image through the non-opaque document sheet in the first side image, wherein the document sheet has at least one edge margin area which does not have an image in that edge margin area, comprising: scanning across the non-opaque document sheet outside of said imaging station in a two axes scanning path with a transmissivity sensing system having a light beam passing through said document sheet, said scanning path passing through said edge margin area of said document sheet which is not imaged, so as to detect the transmissivity of said document sheet unobstructed by said image; and generating an image processing control signal from said transmissivity sensing system proportional to said transmissivity of said document sheet unobstructed by said image for reducing said imaged show-through of said second side image.

Further specific features disclosed in the embodiments herein, individually or in combination, include those wherein said scanning path of said transmissivity sensing system is diagonally across said document sheet from one corner of said document sheet towards the diagonally opposite corner of said document sheet; and/or wherein said document sheet is moving linearly with a first velocity and said transmissivity sensing system is moving linearly at a second velocity orthogonally of said document sheet with a velocity ratio of said second velocity to said first velocity proportional to the ratio of the dimensions of the orthogonal sides of said document sheet being scanned; and/or wherein said document sheet is moved in a first linear movement path while said transmissivity sensing system is moved in a second linear movement path transversely of and in coordination with said first movement path of said document sheet so as to generate said two axes scanning path of said document sheet by moving said transmissivity sensing system on only one axis of movement; and/or wherein said scanning path of said transmissivity sensing system is diagonally across said document sheet from one corner of said document sheet to the diagonally opposing corner of said document sheet so as to pass through all 4 edge margins of said document sheet. 11. The method of imaging a non-opaque duplex document sheet with reduced show-through of claim 9, wherein said scanning path of said transmissivity sensing system is unidirectional in opposite directions and in opposite diagonals across alternate said document sheets.

There is also prior art on details of various transmissivity sensors for documents per se, so that they also do not need to be described in detail herein. Some further examples are described in U.S. Pat. Nos. 4,937,460; 5,067,704; 5,127,643; and 5,248,424.

Since the imaging and control operations of both xerographic or other optical copiers and/or digital scanners or copiers, whether for electronic image storage or xerographic, ink jet or other printing engines, are well known, they need not be described herein. The disclosed systems may be operated and controlled by appropriate operation of conventional control systems. It is well known and preferable in reproduction apparatus to program and execute imaging, printing, paper handling, power switching and other control functions and logic with software instructions for conventional or general purpose microprocessors, as taught by numerous prior patents and commercial products, and commonly referred to as the reproduction machine controller. Sheet path sensors and controls, image development controls, etc., are preferably electrically connected to a controller. The controller programming software may of course vary depending on the particular functions, software type, and microprocessor or other computer system utilized, but will be available to, or readily programmable without undue experimentation from, prior reproduction apparatus products and literature, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs. The resultant controller signals may conventionally actuate various conventional electrical components, such as well know and/or commercially available power supplies and switches, paper path drives and gates, etc., as is well known in the art. The machine control functions may all be centralized in a single motherboard area, or partially distributed in interconnecting daughterboards or chips in different modules or areas.

In the present system, the machine controller can be loaded with different sets of imaging control or manipulation software appropriate for the different sensed document transmissivities.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of specific embodiments, including the drawing figures (approximately to scale) wherein:

Figure 1:
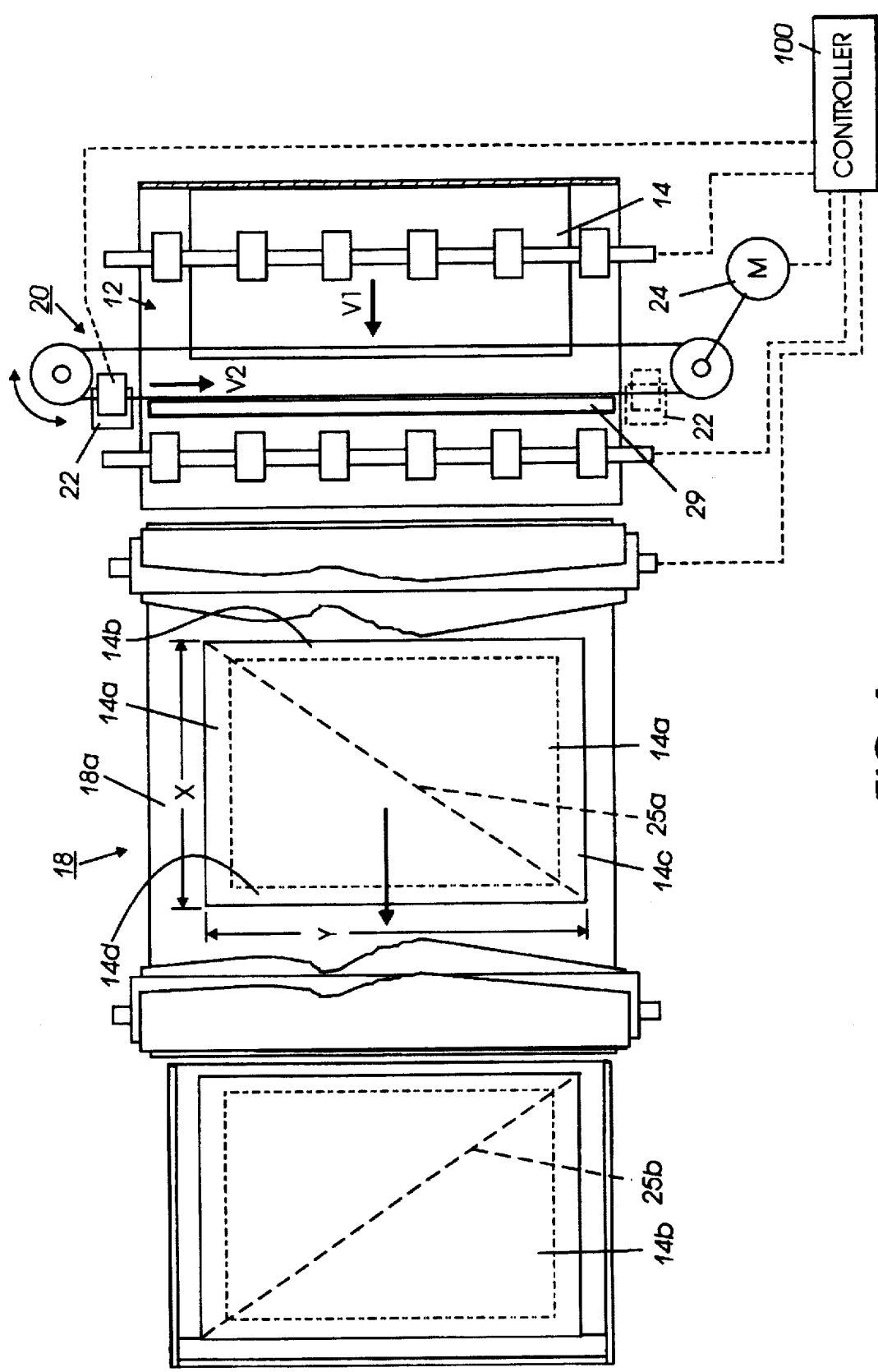
FIG. 1 is a schematic top view of one embodiment of the disclosed transmissivity scanning system in one example of an otherwise conventional document feeding and imaging apparatus, such as in the example of FIG. 2, which is partially removed here for drawing clarity.
Figure 2:
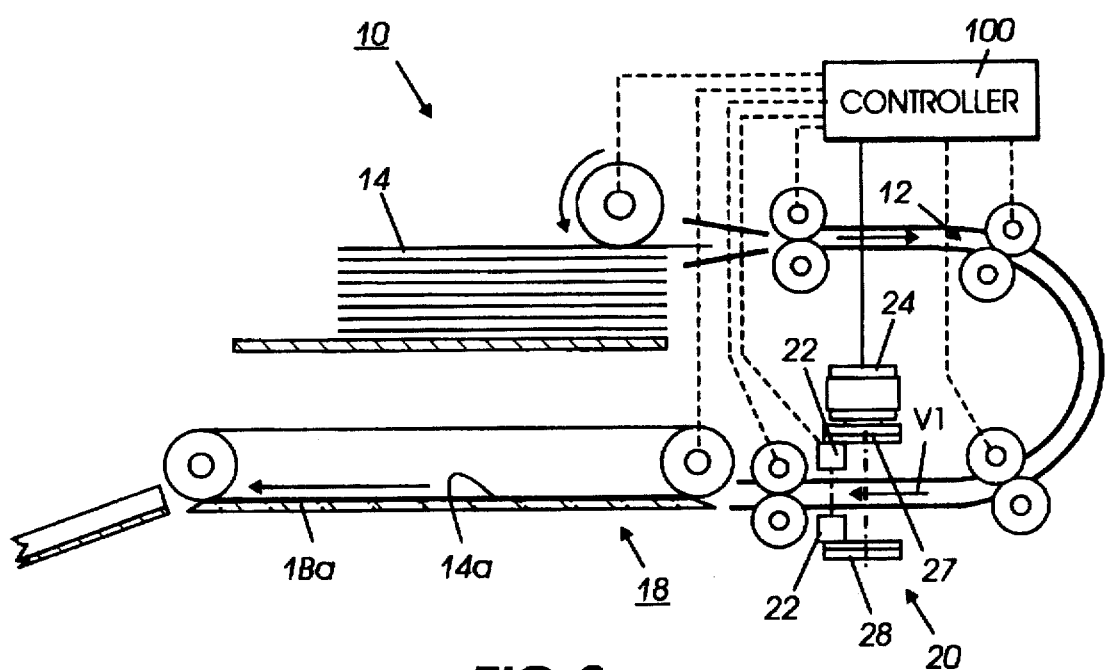
FIG. 2 is a schematic side view of the exemplary embodiment of FIG. 1, also schematically showing a overlying document tray automatic document feeding source merely as one example thereof.

Describing now in further detail this exemplary embodiment with reference to the Figures, there is partially shown in FIGS. 1 and 2 one example of an otherwise conventional image reproduction apparatus or imaging system 10 for imaging documents, having various of the subject and other features, merely by way of one example of the application of and combination with the subject exemplary document substrate transmissivity sensing system. The imaging system 10 has an otherwise conventional document feeding or paper path 12 and its drives, conventionally controlled by a controller 100, and other conventional components. The document sheets 14 are conventionally sequentially fed thereby to a conventional imaging station 18 in the machine 10 to be imaged, by conventionally feeding the documents onto a transparent imaging platen 18a. For illustrative purposes in the exposed top view of FIG. 1, both the document 14a being, or about to be imaged and the immediately prior imaged document 14b ejected into an exit tray are shown with a rectangular phantom dashed outline here slightly inside the document 14 edges, to illustrate typical text margins, that is, to illustrate the typical extent of the text area on the documents 14, indicated here by side, top and bottom edge margins 14a, 14b, 14c and 14d, one or more of which document edge margins are typically outside of the printed text area of a document and thus unprinted.

Here, before being imaged, the documents 14 are scanned for transmissivity by being fed through a scanning system 20 having a simple IR or light beam document transmissivity scanner or sensor 22 linearly moved by a reciprocal scanning drive system 24 transversely of the documents 14 being fed into the imaging station 18. The scanning system 20 could be a modular optional add-on unit, since it requires little additional space, especially if located as shown, just upstream of the imaging station 18 in the document feeding in path 12.

The linear transverse movement V2 of the scanning system 20 here is started and coordinated with the orthogonal velocity of the document 14 passing downstream therethrough, shown by the movement arrow V1 in FIG. 1, to desirably cause each document 14 to be scanned transversely, from one corner to the opposite corner of the document, as shown by the respective diagonal dashed phantom scan lines 25a and 25b on the documents 14a and 14b in FIG. 1 here. However, a difference in scanning direction is shown by the opposing angles of the diagonal dashed phantom scan lines 25a versus 25b shown in sequential documents 14a and 14b. That is because desirably the document scanning here is also bi-directional, that is, the scanning staffs from the top of one document and goes in one direction, and then staffs from the bottom of the next document and goes in the opposite direction, as shown by the respective solid and dashed-line movement arrows associated with scanner 22 in FIG. 1, and its illustrated solid and phantom line positions. This avoids having to delay document feeding to return the scanner 22 back to one side of the document path. Although this causes alternate documents are scanned on opposite diagonals, in both cases a diagonal, two axes, scan is provided which encompasses all four possible edge margins 14a, 14b, 14c and 14d of the sheet. The system 20 here scans the full X and Y dimensions of each document sheet 14, while the document is moving in its X direction, as shown in FIG. 1. That is, by passing from one of two diagonally opposing sheet corners to the opposing sheet corner of each document, the scanning line 25a or 25b also passes through a portion of all the edge margins 14a, 14b, 14c and 14d of each document 14, and thus the scanning line is highly likely to pass over at least one unprinted edge margin area of the document 14. Thus, this scanning path 25a or 25b is highly likely to pass over an unprinted area of the document and thus produce an output signal for controller 100 corresponding to the highest light beam transmissivity (highest translucency, least opaque) reading of the transmissivity sensor 22 for the document 14. That reading or signal should thus be the transmissivity of the document substrate per se, which is the control signal desired to adjust the system to reduce or prevent undesired imaging "show through" problems from opposite side images or otherwise as described above. Although illustrated herein are complete diagonal scans across the entire document, it will be appreciated that in some cases a much shorter scan, such as only quickly scanning in and out of only one corner of a document, may be sufficient.

As described above, the desired two axes sensor 22 scanning path 25a or 25b will reach both corners of the document and thus all 4 edge margin areas of the document. That can be accomplished by setting the scanner initial or staff of scan position to align with the known position of the lateral edge of the document as the document enters the scanner, i.e., to the document 14 Y axis position, as shown in FIG. 1, and then scanning in accordance with the following velocity calculations, which may be preset in the controller 100: Assume the document 14 velocity through the scanning system 20, which is in the X direction shown by its movement arrow, is V1, and the transmissivity (opacity) scanner velocity in the Y direction is V2, where, as shown in this example, the long dimension of the document 14 is Y, and the short dimension of the paper is X, and the document travels long edge or Y first through the opacity scanner system 20, i.e., in the X direction. Then the distances traveled become: $V1 \times t = X$; and thus $t = X/V1$; and $V2 \times t = Y$, and thus $t = Y/V2$. The scanner 22 must in this example travel the Y dimension in the same time t that the document 14 travels the X dimension, in order to fully scan from one corner of the sheet diagonally across to the other, opposite, corner of this sheet of X and Y dimensions. Therefore, X/V1 =Y/V2. The controller 100 can conventionally or otherwise know in advance the ratio of X/Y, from those dimensions of the document 14. Since the system can thereby know the ratio of X to Y, it can, as shown above, establish the velocity ratio of V1 to V2, as the ratio of X to Y. To achieve that desired velocity ratio, the system can fix V1 and vary V2, or fix V2 and vary V1.

To express it in other words, desirably the control system 100 causes the scanner drive system to moves the document sheet light transmissivity measurement system orthogonal of the document sheet to be scanned with a velocity ratio of its own velocity V2 to the velocity V1 of the document sheet in the document feeding path which is proportional to the ratio of the dimensions of the orthogonal sides X and Y respectively of the document sheet being scanned.

To put it another way, here, with only a single axis movement of only a single transmissivity sensor, and preferably with a velocity ratio of the scan movement to the document movement equal to the ratio of the side and end dimensions of the document being scanned, the sensor can scan diagonally across the entire document on both axes from one corner to an opposite corner of the document and thereby scan into all four of the possible unprinted edge margins of the document to obtain a more reliable imaging control signal therefrom.

As is known in the art, the dimensions of a document in a document feeding system, as here, can be determined in different known ways, or combinations thereof. One known way is from the document feeder tray side guide settings, as noted in Xerox Corp. U.S. Pat. No. 5,511,771 issued Apr. 30, 1996 to R. F. Rubscha, and other patents cited in Column 6 thereof, or the like. Other known document path sensor systems detect document dimensions by the timing between the passage of their lead and trail edges. Various of these and other known document size systems can also employ look-up software tables of known standard document sizes, since standard size documents have known length to width or X/Y ratios, and it can normally be assumed that the documents will be only, or almost always, of certain standard sizes in any one country.

Figure 3:
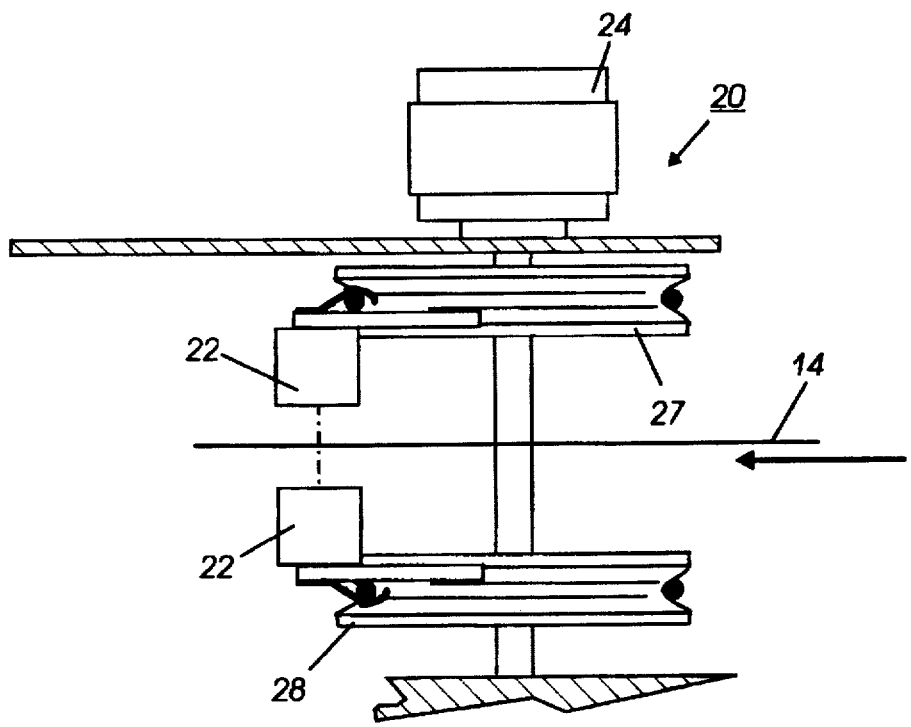
FIG. 3 is an enlarged side view of the exemplary scanner drive system of the transmissivity scanning system of FIGS. 1 and 2.
Figure 4:
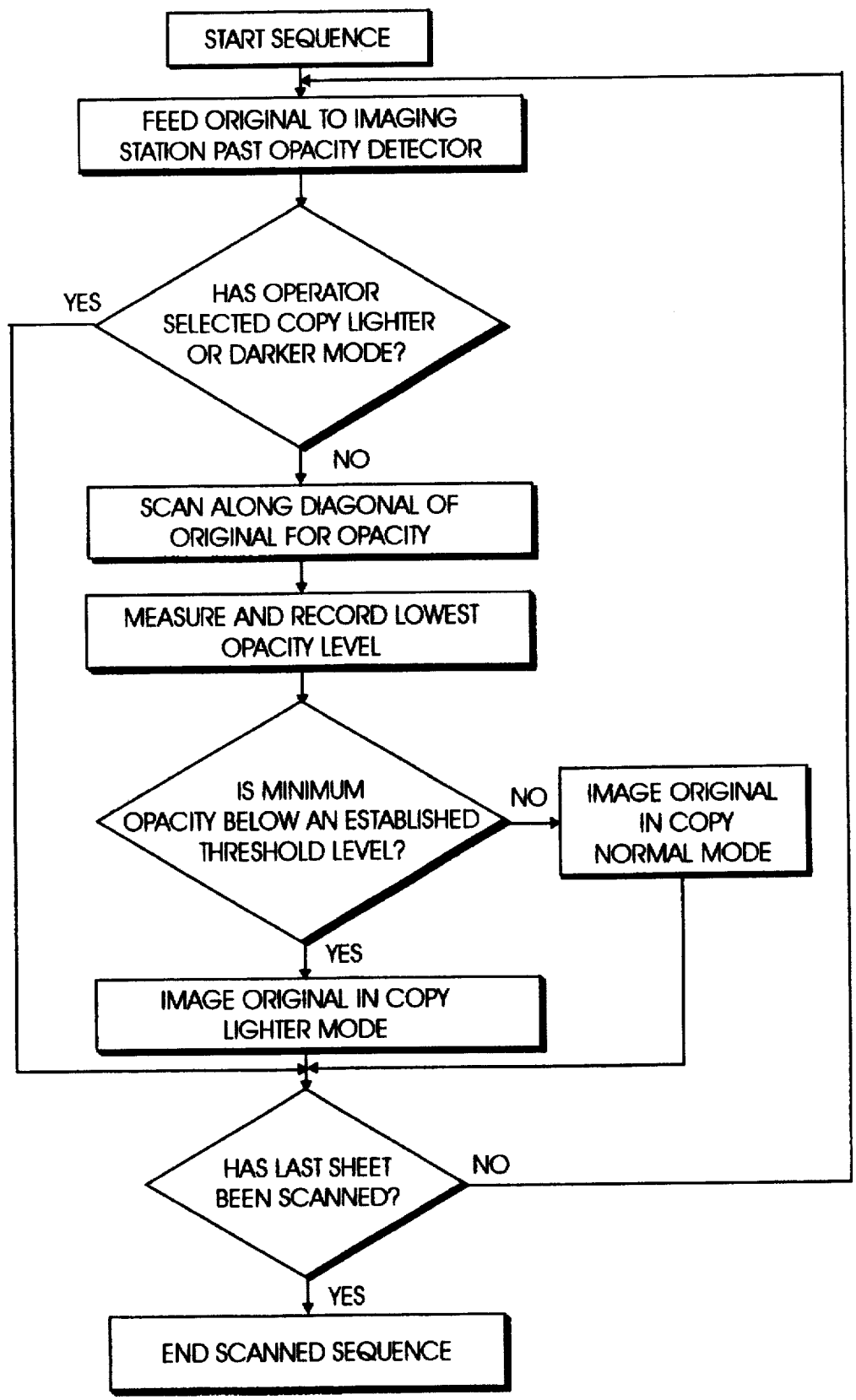
FIG. 4 is one example of a flow chart or schematic circuit for the embodiment of FIGS. 1–3.

The sensing system 20 linear drive system 24 for the sensor 22 can be any of many different simple mechanical and/or electrical systems. As shown enlarged in the side view of FIG. 3, a simple motor drive of spaced pulleys 27 and 28 on opposite sides of the document path moving cables above and below the document path 12 can simultaneously pull an IR or light beam generator and its light beam receiver as a paired unit respectively above or below the document path, transversely thereof, to define a sensor 22 by which the amount of light passing through a document can be continuously measured as the sensor 22 moves, as discussed above. Conventionally, the maximum transmissivity base line output level for the sensor 22 can be measured with no document present therebetween. Furthermore, if desired, a gray or black (opaque) transmissivity test patch window or sensor beam block can be provided at a park position of the scanning drive system 24 at one end of the scan movement path of the sensor 22 in order to provide a low transmissivity base line signal.

Another important advantage of the present off-platen document opacity sensing system, as opposed to an on-platen document sensing system, is that the measured transmissivity is not affected by reflections or contamination from the sensor light beam having to pass through a glass platen. Also, normally there is a required platen cover and/or a document handler with a document platen transport overlying the document and the platen. That would not allow a simple, direct and perpendicular to the document light beam transmissivity system as here. Here, the sensor 22 light beam can look up or down completely unobstructedly through an open slot, such as slot 29 seen in FIG. 1, in the document sheet transport baffles, so that only the document sheet itself is ever in the sensor light beam.

The sensing system 20 is shown here upstream of the imaging station 18, which is normally preferred. However, in the case of an electronic imaging system for either scanning per se for electronic image storage, and/or local or remote printing, where electronic image processing can be done after the image has been captured, the transmissivity testing of the documents could instead be done downstream of the imaging station after the documents are imaged.

While the embodiment disclosed herein is preferred, it will be appreciated from this teaching that various alternatives, modifications, variations or improvements therein may be made by those skilled in the art, which are intended to be encompassed by the following claims:

I claim:

1. In a document reproduction apparatus with an imaging station and a sheet feeding system for feeding physical document sheets in a document sheet feeding path at a first velocity in a document sheet motion direction to said imaging station to be imaged and then fed away from said imaging station, said document reproduction apparatus also having a transmissivity sensor for measuring the transmissivity of the document sheets to be imaged to provide an imaging control signal for reducing show-through imaging defects from light transmissive document sheets including show-through imaging of opposite side images on light transmissive document sheets; the improvement comprising:

a linearly movable document sheet light transmissivity measurement system mounted across said document sheet feeding path outside of said imaging station, a scanning system for linearly moving said document sheet light transmissivity measurement system on a single axis of movement at a second velocity across said document sheet feeding path transversely of said document sheet motion direction, said scanning system being controlled to move said document sheet light transmissivity measurement system transversely across a document sheet moving in said document sheet feeding path in coordination with said document sheet movement past said document sheet light transmissivity measurement system so that said document sheet light transmissivity measurement system diagonally scans the document sheet on two axes, to provide a more accurate transmissivity measurement of the document sheet than a single axis transmissivity scan.

2. The document reproduction apparatus of claim 1, wherein said scanning system is controlled to move said document sheet light transmissivity measurement system with a velocity ratio of said second velocity to said first velocity of the document sheets proportional to the ratio of the dimensions of the orthogonal sides of the document sheet being scanned.

3. The document reproduction apparatus of claim 1, wherein said scanning system is controlled to scan said document sheet light transmissivity measurement system diagonally across a document sheet from one corner of the document sheet to an opposite corner of the document sheet.

4. The document reproduction apparatus of claim 1, wherein said document sheet light transmissivity measurement system is mounted upstream of said imaging station and moves orthogonally to the direction of movement of the document sheet to diagonally scan the document sheet on two axes before the document is imaged.

5. The document reproduction apparatus of claim 1, wherein said document sheet light transmissivity measurement system comprises an unobstructed vertical light beam projecting perpendicularly through the document sheet being scanned.

6. A method of imaging a non-opaque duplex document sheet with images on both the first and second sides thereof being imaged at an imaging station by improving the reproduction of the images on one side of the document sheet by reducing the imaged show-through of the second side image through the non-opaque document sheet in the first side image, wherein the document sheet has at least one edge margin area which does not have an image in that edge margin area, comprising:

scanning across the non-opaque document sheet outside of said imaging station in a two axes scanning path with a transmissivity sensing system having a light beam passing through said document sheet, said scanning path passing through said edge margin area of said document sheet which is not imaged, so as to detect the transmissivity of said document sheet unobstructed by said image; and generating an image processing control signal from said transmissivity sensing system proportional to said transmissivity of said document sheet unobstructed by said image for reducing said imaged show-through of said second side image.

7. The method of imaging a non-opaque duplex document sheet with reduced show-through of claim 6, wherein said scanning path of said transmissivity sensing system is diagonally across said document sheet from one corner of said document sheet towards the diagonally opposite corner of said document sheet.

8. The method of imaging a non-opaque duplex document sheet with reduced show-through of claim 6, wherein said document sheet is moving linearly with a first velocity and said transmissivity sensing system is moving linearly at a second velocity orthogonally of said document sheet with a velocity ratio of said second velocity to said first velocity proportional to the ratio of the dimensions of the orthogonal sides of said document sheet being scanned.

9. The method of imaging a non-opaque duplex document sheet with reduced show-through of claim 6, wherein said document sheet is moved in a first linear movement path while said transmissivity sensing system is moved in a second linear movement path transversely of and in coordination with said first movement path of said document sheet so as to generate said two axes scanning path of said document sheet by moving said transmissivity sensing system on only one axis of movement.

10. The method of imaging a non-opaque duplex document sheet with reduced show-through of claim 9, wherein said scanning path of said transmissivity sensing system is diagonally across said document sheet from one corner of said document sheet to the diagonally opposing corner of said document sheet so as to pass through all 4 edge margins of said document sheet.

11. The method of imaging a non-opaque duplex document sheet with reduced show-through of claim 9, wherein said scanning path of said transmissivity sensing system is unidirectional in opposite directions and in opposite diagonals across alternate said document sheets.

* * * * *